United States Patent
Sendonaris et al.

(10) Patent No.: US 10,241,190 B2
(45) Date of Patent: Mar. 26, 2019

(54) POSITION ESTIMATION OF A RECEIVER USING ANCHOR POINTS

(71) Applicant: NextNav, LLC, Sunnyvale, CA (US)

(72) Inventors: Andrew Sendonaris, Los Gatos, CA (US); Mir Mahmood, Mountain View, CA (US)

(73) Assignee: NextNav, LLC, Sunnyvale, CA (US)

( * ) Notice: Subject to any disclaimer, the term of this patent is extended or adjusted under 35 U.S.C. 154(b) by 168 days.

(21) Appl. No.: 15/267,980

(22) Filed: Sep. 16, 2016

(65) Prior Publication Data

US 2017/0082727 A1    Mar. 23, 2017

Related U.S. Application Data

(60) Provisional application No. 62/221,076, filed on Sep. 20, 2015, provisional application No. 62/233,957, filed on Sep. 28, 2015.

(51) Int. Cl.
| | |
|---|---|
| *G01S 5/02* | (2010.01) |
| *H04W 64/00* | (2009.01) |
| *G01C 21/20* | (2006.01) |
| *G01S 11/02* | (2010.01) |
| *G01S 1/68* | (2006.01) |

(52) U.S. Cl.
CPC .......... *G01S 5/0284* (2013.01); *G01C 21/206* (2013.01); *G01S 5/02* (2013.01); *G01S 5/0226* (2013.01); *G01S 5/0252* (2013.01); *G01S 5/0263* (2013.01); *G01S 11/02* (2013.01); *H04W 64/00* (2013.01); *G01S 1/68* (2013.01); *G01S 5/0294* (2013.01)

(58) Field of Classification Search
CPC ........ G01S 5/0284; G01S 5/02; G01S 5/0226; G01S 5/0252; G01S 5/0263; G01S 11/02; G01C 21/206; H04W 64/00
USPC .......................................................... 342/464
See application file for complete search history.

(56) References Cited

U.S. PATENT DOCUMENTS

| | | | |
|---|---|---|---|
| 8,130,141 B2 | 3/2012 | Pattabiraman | |
| 8,738,024 B1* | 5/2014 | Kerr ...................... | G01S 5/0252 455/456.5 |
| 2013/0029685 A1* | 1/2013 | Moshfeghi .............. | G01S 19/48 455/456.1 |
| 2013/0252631 A1* | 9/2013 | Alizadeh-Shabdiz | ...................... H04W 4/025 455/456.1 |
| 2013/0278462 A1 | 10/2013 | Burrell | |

(Continued)

FOREIGN PATENT DOCUMENTS

WO    2007031807 A1    3/2007

OTHER PUBLICATIONS

Applicant, Reply to International Search Report and Written Opinion of International Searching Authority, European Patent Application No. EP16774581.9, 18 pages, dated Jun. 28, 2018.

(Continued)

*Primary Examiner* — Harry K Liu

(57) ABSTRACT

Estimating one or more positions of a receiver using one or more anchor points. Systems and methods for estimating a position of a receiver using a particular anchor point may identify an area of interest that includes anchor points, identify the particular anchor point, and then use information about the particular anchor point to estimate the position of the receiver.

20 Claims, 17 Drawing Sheets

(56) References Cited

U.S. PATENT DOCUMENTS

| | | | | |
|---|---|---|---|---|
| 2014/0288822 | A1* | 9/2014 | Morrison | G01S 19/23 |
| | | | | 701/466 |
| 2015/0029945 | A1* | 1/2015 | Do | H04W 76/10 |
| | | | | 370/329 |
| 2015/0309180 | A1* | 10/2015 | Jiang | G01S 5/0252 |
| | | | | 701/468 |
| 2015/0326704 | A1* | 11/2015 | Ko | H04M 1/7253 |
| | | | | 455/456.3 |
| 2016/0044467 | A1* | 2/2016 | Clausen | H04W 4/04 |
| | | | | 455/457 |
| 2016/0178728 | A1* | 6/2016 | Liu | G01S 19/40 |
| | | | | 455/456.1 |
| 2016/0198309 | A1* | 7/2016 | Yoo | H04W 4/043 |
| | | | | 455/456.1 |

OTHER PUBLICATIONS

Form PCT/ISA/220, PCT/US2016/052206, "Notification of Transmittal of the International Search Report and the Written Opinion of the International Searching Authority, or the Declaration", 1 page(s); Form PCT/ISA/210, PCT/US2016/052206, "International Search Report", 5 page(s); EP Form PO4A42, 1 page(s); Form PCT/ISA/237, PCT/US2016/052206, "Written Opinion of the International Searching Authority", 7 page(s), dated Feb. 13, 2017.

Form PCT/ISA/206, PCT/US2016/052206, "Invitation to pay additional fees and, where applicable, protest fee", 5 pages, EPO Form P04A42, PCT/US2016/052206, "Information on Search Strategy", 1 page, dated Dec. 22, 2016.

* cited by examiner

| Locations of Anchor Points Shown in FIG. 1A or FIG. 1B |||||
|---|---|---|---|---|
| Anchor Point | Latitude | Longitude | Altitude | Region |
| 1 (Entry/exit) | $X_1$ | $Y_1$ | $Z_1$ (Altitude 1) | 1 |
| 2 (LAN Node) | $X_2$ | $Y_2$ | $Z_2$ (Altitude 1) | 2 |
| 3 (Stair – 1st floor) | $X_3$ (same as $X_4$) | $Y_3$ | $Z_3$ (Altitude 1) | 3 |
| 4 (Stair – 2nd floor) | $X_4$ (same as $X_3$) | $Y_4$ | $Z_4$ (Altitude 2) | 4 |
| 5 (Point of Reference) | $X_5$ | $Y_5$ | $Z_5$ (Altitude 2) | 5 |
| 6 (Elevator – 2nd floor) | $X_6$ (same as $X_7$) | $Y_6$ (same as $Y_7$) | $Z_6$ (Altitude 2) | 6 |
| 7 (Elevator – 1st floor) | $X_7$ (same as $X_6$) | $Y_7$ (same as $Y_6$) | $Z_7$ (Altitude 1) | 7 |
| 8 (Point of Reference) | $X_8$ | $Y_8$ | $Z_8$ (Altitude 1) | 8 |

FIG. 2A

| Locations of and Conditions for Detecting Anchor Points Shown in FIG. 3A |||
|---|---|---|
| Anchor Point | Location | Condition |
| A (Boundary) | $(x,y,z)_A$ | $(x,y,z)_{Rx}$ is at or near $(x,y,z)_A$ |
| B (LAN Node) | $(x,y,z)_B$ | Rx is within range of signal from LAN Node |
| C (Pathway) | $(x,y,z)_C$ | $(y,z)_{Rx}$ is changing while $(x)_{Rx}$ is not changing |
| D (Point of Reference) | $(x,y,z)_D$ | Transmitter signal strength meets threshold strength condition |
| E (Elevator) | $(x,y,z)_E$ | $(z)_{Rx}$ is changing while $(x,y)_{Rx}$ are not changing |
| F (Point of Reference) | $(x,y,z)_F$ | Transmitter signal strength meets threshold strength condition |

FIG. 3B

| Crowd-Sourced Metrics ||||||| 
|---|---|---|---|---|---|---|
| True/Refined Position Estimate | Initial Estimate | Pseudo-range (PR) | Multipath (MP) Delay | MP Delay (std deviation) | Signal Strength | Anchor Point |
| $x_1\ y_1\ z_1$ | $x_1'\ y_1'\ z_1'$ | $PR_1$ | $MP_1$ | $+/-\ mp_1$ | $dBm_1$ | Y |
| ... | ... | ... | ... | ... | ... | ... |
| $x_n\ y_n\ z_n$ | $x_n'\ y_n'\ z_n'$ | $PR_n$ | $MP_n$ | $+/-\ mp_n$ | $dBm_n$ | N |

| Ascending/Descending Anchor Points | | | | |
|---|---|---|---|---|
| Anchor Point Type | Entry/Exit (Altitude 1) | Entry/Exit (Altitude 2) | Rate of Ascent/ Descent | Lag Coefficient |
| Stair | $(x,y,z)_{Stair,1}$ | $(x,y,z)_{Stair,2}$ | $R_{Stair}$ | $C_{Stair}$ |
| Escalator | $(x,y,z)_{Esc,1}$ | $(x,y,z)_{Esc,2}$ | $R_{Esc}$ | $C_{Esc}$ |
| Elevator | $(x,y,z)_{Elv,1}$ | $(x,y,z)_{Elv,2}$ | $R_{Elv}$ | $C_{Elv}$ |

POSITION ESTIMATION OF A RECEIVER USING ANCHOR POINTS

FIELD

This disclosure relates to estimating a position of a receiver using anchor points.

BACKGROUND

Determining the exact location of a receiver (e.g. a mobile phone) in an environment can be quite challenging, especially when the receiver is located in an urban environment, or is located within a building. Imprecise estimates of the receiver's position may have "life or death" consequences for the user. For example, an imprecise position estimate of a receiver, such as a mobile phone operated by a user calling 911, can delay emergency personnel response times. In less dire situations, imprecise estimates of the receiver's position can negatively impact navigation applications by sending a user to the wrong location, or taking too long to provide accurate directions.

Positioning systems used to estimate the position of the receiver, like the Global Positioning System (GPS), have been in use for many years. Unfortunately, poor signal conditions found in urban or indoor environments may degrade the performance of these conventional positioning systems. To improve positioning accuracy in urban and indoor environments, GPS may be augmented by positioning systems that use terrestrial transmitters, however it is still the case that when the receiver is within an urban area or inside a building, the augmented positioning system is often ineffective. Thus, new approaches that solve the above problems are needed.

BRIEF DESCRIPTION OF THE DRAWINGS

FIG. 2A shows a table of locations and regions corresponding to anchor points.

FIG. 3B shows a table of locations and conditions corresponding to anchor points.

Like reference numbers and designations in the drawings indicate like elements.

DETAILED DESCRIPTION

This disclosure includes various approaches for identifying location(s) of a receiver using anchor point(s).

"Anchor points" may be used to determine the position of a receiver within an area of interest such as a large building and/or outside in an urban area. Anchor points include locations within the area of interest that are at a known location or in a known region. The known locations or regions can be stored in a data source that is accessible by the receiver. Such a data source may be remotely located (e.g. at a server or at the particular anchor points) and may be accessed by the receiver.

Anchor points may be located at fixed features of an environment, such as points of entry and exit (e.g. doors) and ascending and descending pathways (e.g. stairs, ramps, escalators, or elevators). An anchor point may include a local area network node (e.g. a Wi-Fi hotspot, a near field communication (NFC) terminal). An anchor point may be a location in an area of interest that has been surveyed to identify characteristics of signals received at that location.

Anchor points may be identified by a receiver when the receiver is at or within a known distance from the anchor point. If the receiver determines that it is at or within a specified distance from (i.e. collectively described as "near") an anchor point, the receiver may use the location of the anchor point as its estimated position. When the receiver determines that it is at or within a known distance from an anchor point, the receiver may use the location of the anchor point as its estimated position. Alternatively, when the receiver determines that it is within a known distance from an anchor point, the receiver may estimate its position relative to the location of the anchor point (e.g. by estimating a distance between the anchor point and the receiver, and a direction from the anchor point to the receiver).

A stored location of an anchor point may be used to augment initial position estimates of a receiver that were generated using satellite, terrestrial, and or other positioning systems.

A stored location of an anchor point may be used with an inertial tracking system of a receiver to track the receiver's movement.

An anchor point may be used to determine metrics related to positioning signals that are received by a receiver from a positioning system, including such metrics as multipath delay, signal-to-noise, pseudoranges estimated from the signals, and other metrics.

Further details about each of the above approaches, in addition to other approaches, are provided below following a brief description of systems that may be used by these approaches.

Example Systems

Figure 1A:
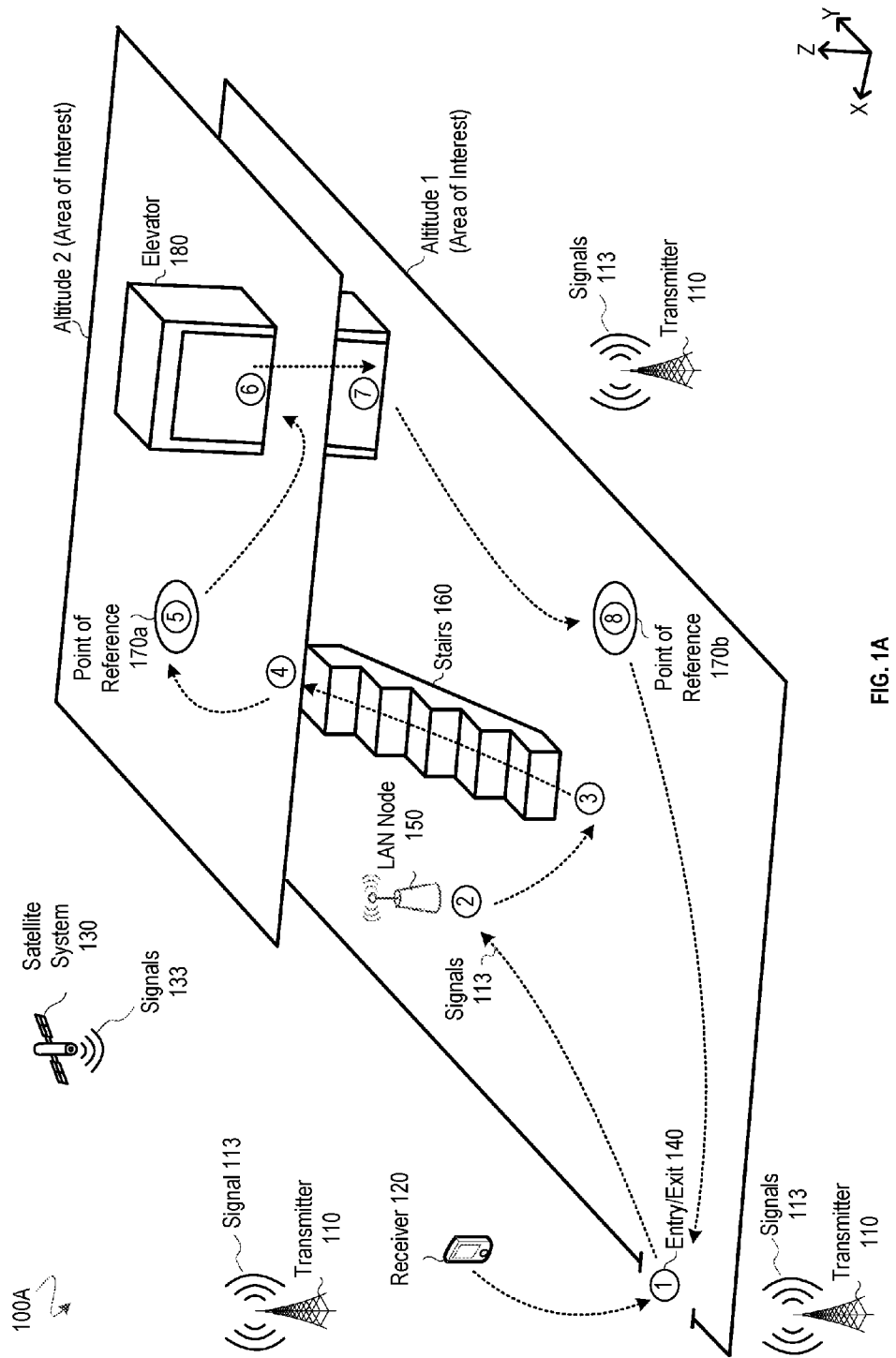
FIG. 1A depicts an indoor environment within which different embodiments are implemented for identifying locations of a receiver using anchor points.

FIG. 1A depicts an indoor environment 100A within which different embodiments are implemented for identifying locations of a receiver using anchor points. The environment 100A includes terrestrial transmitters 110, a receiver 120, a satellite system 130 with one or more satellites, and a variety of anchor points (1)-(8).

The transmitters 110 transmit signals 113, which are received by the receiver 120. Each of the signals 113 may carry different information that, once extracted by the receiver 120, may be used to determine pseudoranges between the transmitters 110 and the receiver 120, which may be used to determine an initial position of the receiver 120. Similarly, the satellite system 130 transmits signals 133, which are received by the receiver 120, and may be used to determine pseudoranges between satellites of the satellite system 130 and the receiver 120 to determine an initial position of the receiver 120.

The receiver 120 may include a signal processing component that computes pseudoranges and uses the pseudoranges to estimate its position. Of course, computation and use of pseudoranges may be performed by a remote server that communicates with the receiver 120. The receiver 120 may also include sensors, including atmospheric sensors (e.g. pressure, temperature, etc.), and sensors to track the receiver 120's movement within the environment 100A.

As shown in FIG. 1A, the anchor points (1)-(8) include: (1) an entry/exit 140 (e.g. a door); (2) a LAN node 150 (e.g. a Wi-Fi hotspot, an NFC terminal, a Bluetooth beacon, or other node known in the art); (3) one level of a stairway 160; (4) another level of the stairway 160; (5) a first point of reference 170a; (6) one level of an elevator 180; (7) another level of the elevator 180; and (8) a second point of reference 170b. These anchor points are also depicted in FIG. 1B, which depicts an indoor environment 100B within which regions near the anchor points (1)-(8) are used to identify a regional location of the receiver 120.

As discussed below in relation to FIG. 2A and FIG. 2B, the anchor points (1)-(8) can be used to estimate the position of the receiver 120.

Figure 1B:
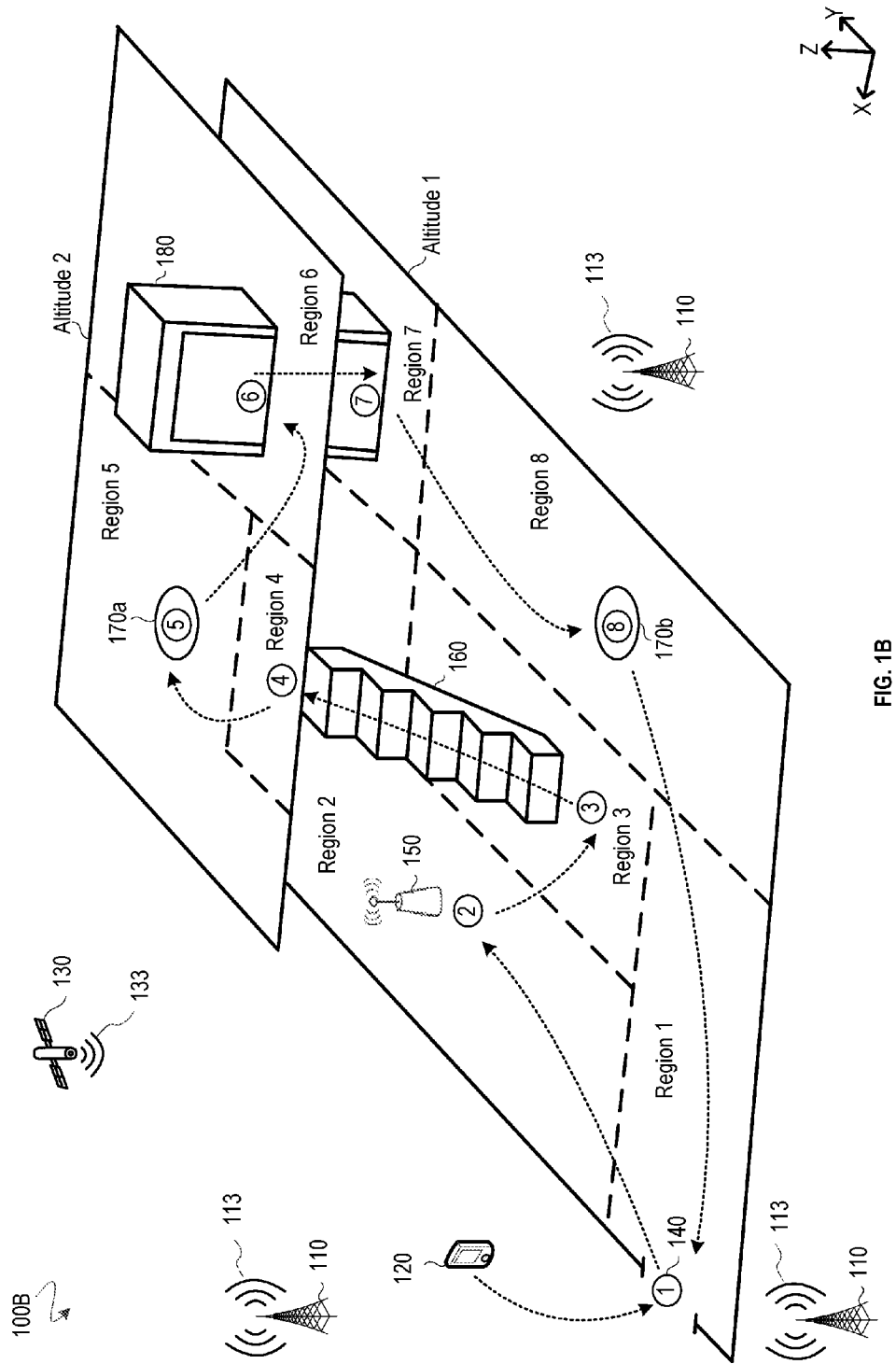
FIG. 1B depicts an indoor environment within which regions near anchor points are used to identify a regional location of a receiver.

FIG. 2A shows a table of locations and regions corresponding to the anchor points (1)-(8) of FIG. 1A or FIG. 1B. The table can be stored in a suitable data source that may be accessed when estimating the position of the receiver 120. As shown, the table includes latitude, longitude and altitude (LLA) for each anchor point, as well as a region designator for that anchor point. The LLA for each anchor point may have been generated using various approaches, including accurately measuring the LLA, surveying the LLA using crowd-sourced position estimates of receivers, or other approaches.

With regards to the region designator, upon detecting that the receiver is near an anchor point within a region, the receiver may access a variety of stored data pertaining to the region such as signal metrics, presence of ascending/descending pathways, or other information. The receiver may make use of the data in ways that will be discussed later.

Figure 2B:
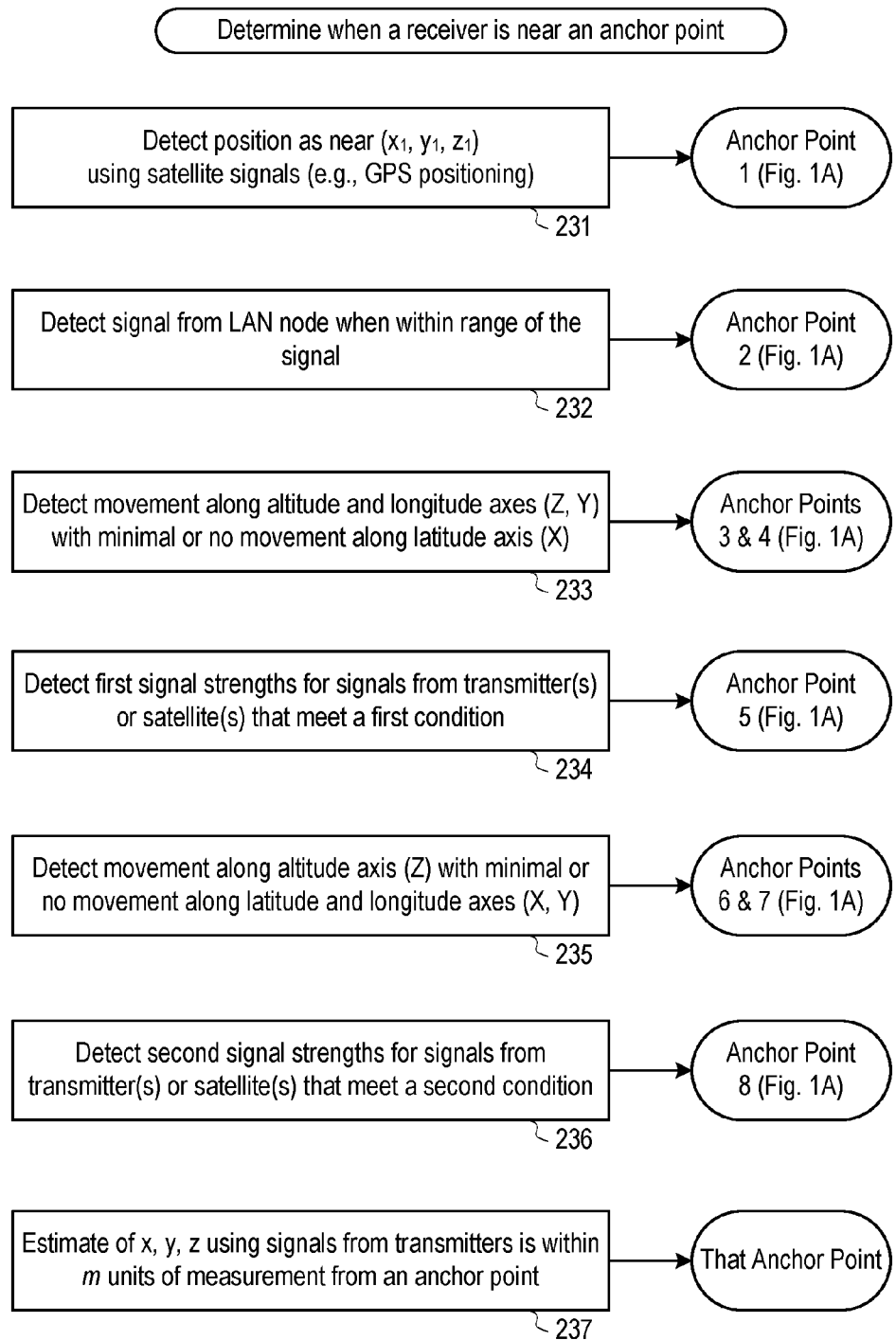
FIG. 2B details various methods for determining if a receiver is near an anchor point.

FIG. 2B details various methods for determining if the receiver 120 is near an anchor point of FIG. 1A or FIG. 1B.

For example, it may be determined that the receiver 120 is near Anchor Point 1 (i.e. the entry/exit 140) if the position of the receiver 120 is estimated as being near the point $(x_1, y_1, z_1)$ using the satellite signals 133 (e.g. GPS positioning) (step 231). Of course, other positioning signals could be used, including the signals 113 from the transmitters 110.

It may be determined that the receiver 120 is near Anchor Point 2 if the receiver 120 detects that the receiver 120 is within the range of signals from a LAN node 150 (step 232).

It may be determined that the receiver 120 is between Anchor Points 3 & 4 if the receiver 120 detects at least a predefined amount of movement along altitude axis (Z), at least a predefined amount of movement along longitude axis (Y), and less than a predefined amount of movement along latitude axis (X) (step 233). Of course, the orientation of the stairs 160 could be along three axes instead of two axes, and movement along those three axes could be tracked.

It may be determined that the receiver 120 is near Anchor Point 5 if the receiver 120 detects signal strengths for signals from transmitter(s) 110 or satellite(s) 130 that meet a first condition (e.g. the signal strengths are within first amounts of threshold strengths corresponding to each of the transmitters 110, the satellites of the satellite system 130, or one or more beacons of a local area network) (step 234).

It may be determined that the receiver 120 is near Anchor Points 6 & 7 if the receiver 120 detects movement along altitude axis (Z) with minimal or no movement along latitude axis (X) and longitude axis (Y) (step 235).

It may be determined that the receiver 120 is near Anchor Point 8 if the receiver 120 detects signal strengths for signals from transmitter(s) 110 or satellite(s) 130 that meet a second condition (e.g. the signal strengths are within second amounts of threshold strengths corresponding to each of the transmitters 110, the satellites of the satellite system 130, or one or more beacons of a local area network) (step 236).

Finally, it may be determined that the receiver 120 is near an anchor point if the initial position estimate (x, y, z) of the receiver 120 generated using the signals 113 and/or the signals 133 is within m units of measurement from that anchor point, where m is predetermined (e.g. a known amount of position error or another amount) (step 237).

Figure 3A:
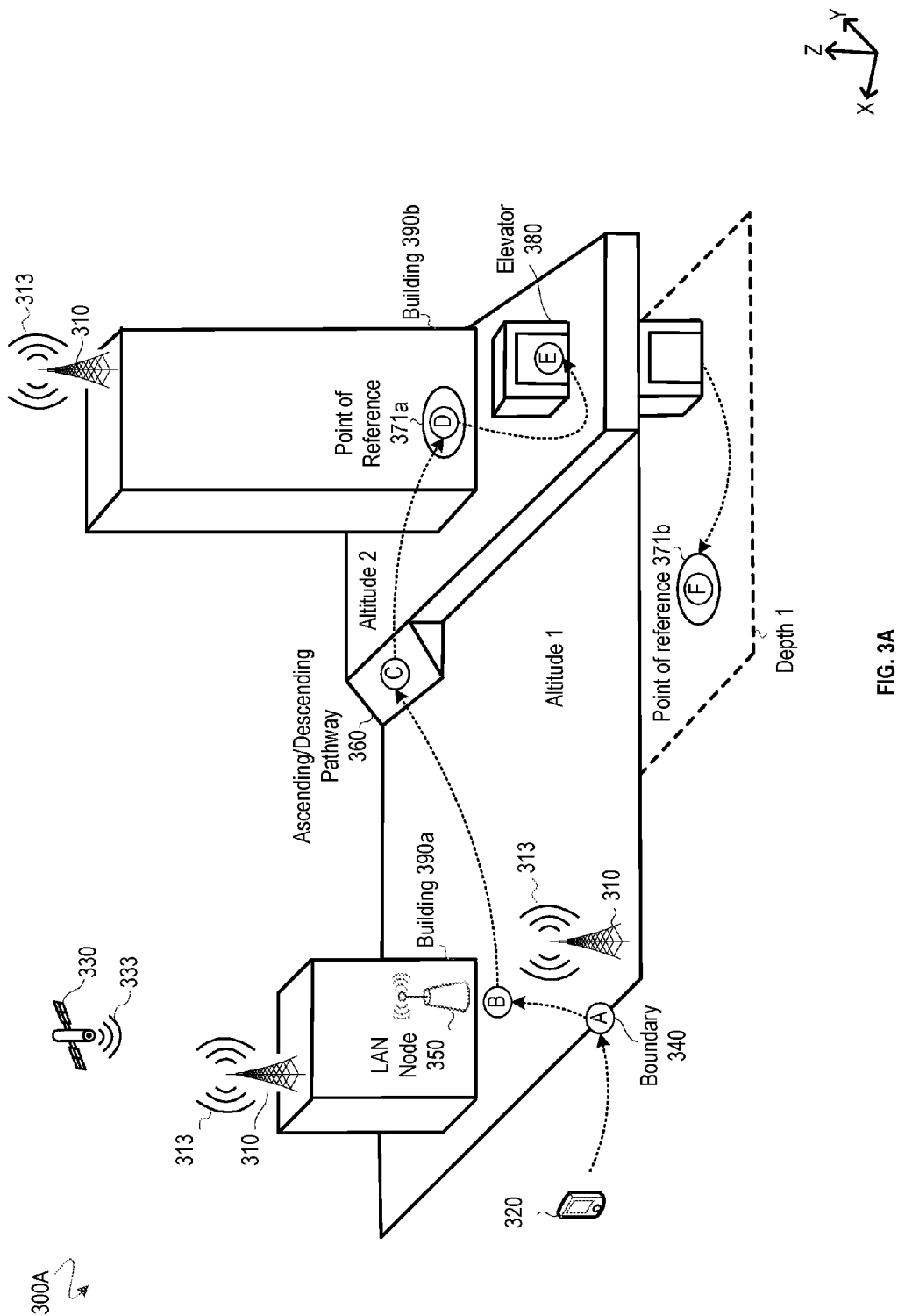
FIG. 3A depicts an indoor and outdoor environment within which different embodiments are implemented for identifying locations of a receiver using anchor points.

Attention is now drawn to FIG. 3A, which depicts an indoor and outdoor environment 300A, within which different embodiments are implemented for identifying locations of a receiver using anchor points (A)-(F). The environment 300A includes terrestrial transmitters 310, a receiver 320, a satellite system 330 with one or more satellites, and a variety of anchor points (A)-(F). Features of the transmitters 110, the receiver 120 and the satellite system 130 from FIG. 1A are incorporated here for the transmitters 310, the receiver 320 and the satellite system 330.

As shown in FIG. 3A, the anchor points (A)-(F) include: (A) a boundary 340; (B) a LAN node 350; (C) an ascending/descending pathway 360; (D) a first point of reference 371a; (E) an elevator 380; and (F) a second point of reference 371b. As discussed below in relation to FIG. 3B, the anchor points (A)-(F) can be used to estimate the position of the receiver 320.

FIG. 3B shows a table of locations and conditions corresponding to the anchor points of FIG. 3A. The table can be stored in a suitable data source that may be accessed by a system that estimates the position of the receiver 320. The relationship between conditions observed by the receiver 320 and a corresponding anchor point will be discussed below.

As shown in the table, if the receiver 320 determines that its position $(x, y, z)_{Rx}$ is near location $(x, y, z)_A$, the receiver 320 may conclude that it is near the Anchor Point 'A' (i.e. the boundary 340).

If the receiver 320 is able to receive signals transmitted from the LAN node 350, the receiver 320 may conclude that it is near the Anchor Point 'B' (i.e. the LAN node 350).

If the receiver 320 observes that it's position along the (Y) axis and the (Z) axis is changing while its position along the (X) axis is not changing beyond predefined X axis boundaries, the receiver 320 may conclude that it is at Anchor Point 'C' (i.e. the path 360). That is, if the receiver 320 is ascending the path 360 it will observe a change in elevation coupled with an observation that it is traveling in the direction of the path 360. The receiver 320 may then determine that it is near the Anchor Point 'C'.

If the receiver 320 determines that the received signal strength of the signals 313 or the signals 333 meet a condition (e.g. a threshold signal strength), the receiver 320 may conclude that it is near Anchor Point 'D' or Anchor Point 'F'. The receiver 320 may disambiguate which of the two anchor points it is at in a number of ways as discussed above for anchor points 5 and 8, and also discussed below in relation to FIG. 10.

If the receiver 320 observes that its position along the (Z) axis is changing while its position along the (X) axis and (Y) axis is not changing beyond predefined X axis boundaries and Y axis boundaries, the receiver 320 may conclude that it is at Anchor Point 'E' (i.e. the elevator 380). That is, if the receiver 320 is ascending or descending in the elevator 380, the receiver 320 will observe a change in elevation coupled with an observation that its horizontal position is not changing beyond horizontal plane boundaries. The receiver 320 may then determine that it is at the Anchor Point 'E'.

Example Processes for Using Anchor Points

Figure 4:
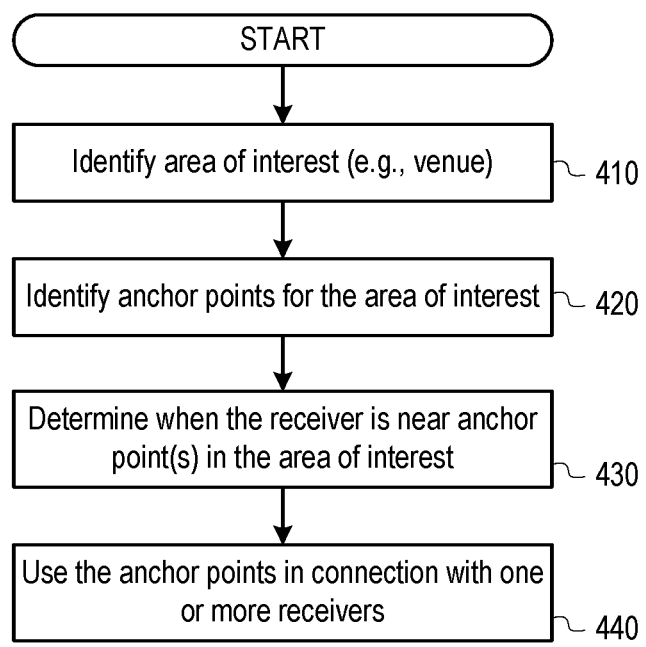
FIG. 4 shows a process for finding and using an anchor point.

FIG. 4 shows a process for finding and using an anchor point. The process includes the steps of: identifying an area of interest (e.g. venue, neighborhood) (step 410); identifying anchor points for the area of interest (step 420); determining when the receiver is near the anchor point(s) in the area of interest (step 430); and using the anchor points in connection with one or more receivers (step 440). Elaboration on these steps and ways in which the anchor points may be used will be described in relation to the remaining figures.

Identification of the area of interest and its anchor points may be carried out in different ways. In one embodiment, the receiver may generate a position estimate from satellite signals, terrestrial signals, dead reckoning, or other methods as are known in the art. The position estimate may be compared to data that is stored at the receiver or at a data source remote from the receiver to determine if the position estimate is within a threshold of a venue or neighborhood. The threshold may change for different venues. In one example, a sports stadium venue may have a threshold of 500 meters or more, and a small store venue may have a threshold of 30 meters or less. The data may be partially or wholly contained in a data source that may be connected to the receiver. The receiver may load at least some information about anchor points associated with a venue or other area of interest when the receiver determines that it is within a threshold distance from the venue, or when a signal from an anchor point associated with the venue or other area of interest is received, and when a characteristic of the signal meets a predefined condition (e g minimum signal strength or other condition). The condition may be, by way of example −80 dBm, or another suitable value, and the condition may be different for different anchor points.

Figure 5:
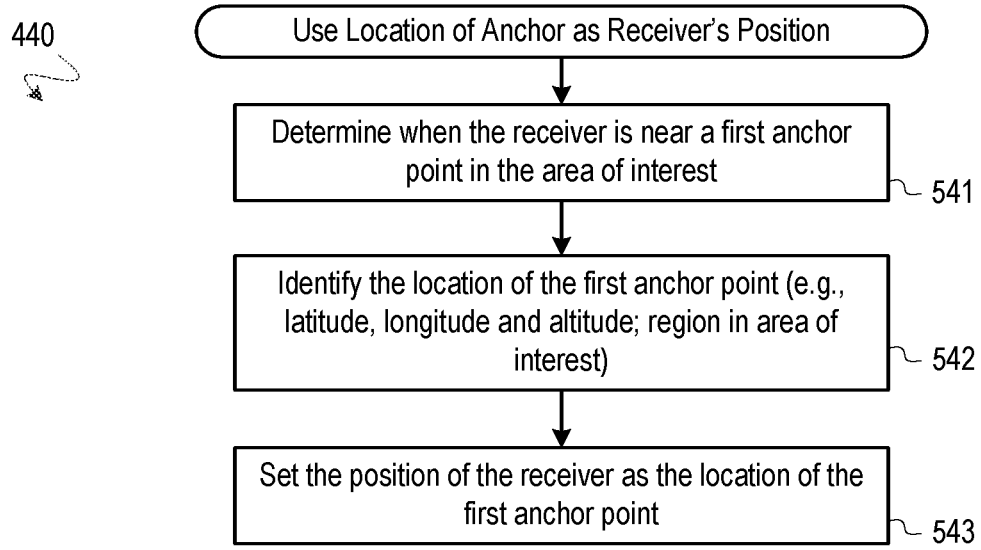
FIG. 5 shows a process for estimating a position of a receiver using a location of an anchor point.

FIG. 5 shows a process for estimating a position of a receiver using a location of an anchor point. This process could occur as part of step 440 of FIG. 4. The process includes the steps of: determining when the receiver is near a first anchor point in the area of interest (step 541); identifying the location of the first anchor point (e.g. latitude, longitude and altitude; region in area of interest) (step 542); and setting the position of the receiver as the location of the first anchor point (step 543). For instance, even if a receiver is in a venue where no other means for estimating its position is available, the receiver will be able to generate a position estimate at each of the anchor points the receiver can identify.

Figure 6A:
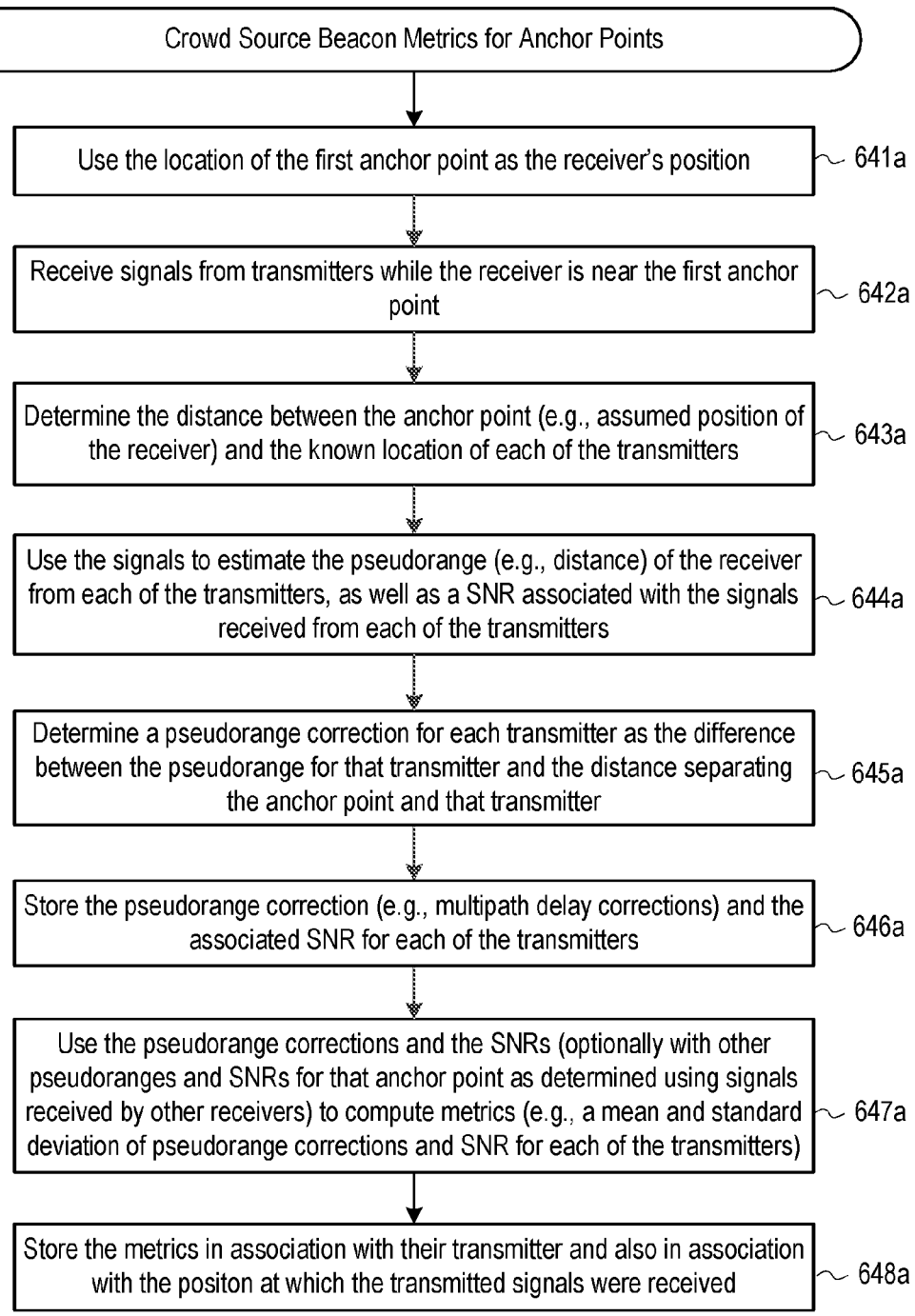
FIG. 6A shows a process for updating a crowd-sourced database of metrics associated with signals received by receivers near an anchor point.

FIG. 6A shows a process for updating a crowd-sourced database of metrics associated with signals received by receivers near an anchor point. This process could occur as part of step 440 of FIG. 4. The process includes the steps of: using the location of the first anchor point as the receiver's position (step 641a); receiving signals from transmitters while the receiver is near the first anchor point (step 642a); determining the distance between the anchor point (e.g. assumed position of the receiver) and each known location of the transmitters (step 643a); using the signals to estimate the pseudorange (e.g. estimate the distance) of the receiver from each of the transmitters, as well as signal-to-noise ratios (SNRs) for the signals received from each of the transmitters (step 644a); determining a pseudorange correction for each transmitter as the difference between the pseudorange for that transmitter and the distance separating the anchor point and that transmitter (step 645a) (of course, each correction could be merely based on the difference in some way instead of being set to the difference); for each of the transmitters, storing that transmitter's pseudorange, pseudorange correction (also referred to as "multipath delay") and/or the SNR associated with the signal transmitted by that transmitter (step 646a); using the pseudorange, pseudorange corrections, and/or the SNRs (optionally with other pseudoranges, pseudorange corrections, and/or SNRs for that anchor point as determined using signals received by other receivers) to compute metrics (e.g. mean and standard deviations of pseudoranges, pseudorange corrections and/or SNRs for each of the transmitters) (step 647a); and storing the metrics in association with their transmitter and also in association with the anchor point and/or an estimate of the receiver's position at which the transmitted signals were received (step 648a).

Figure 6B:
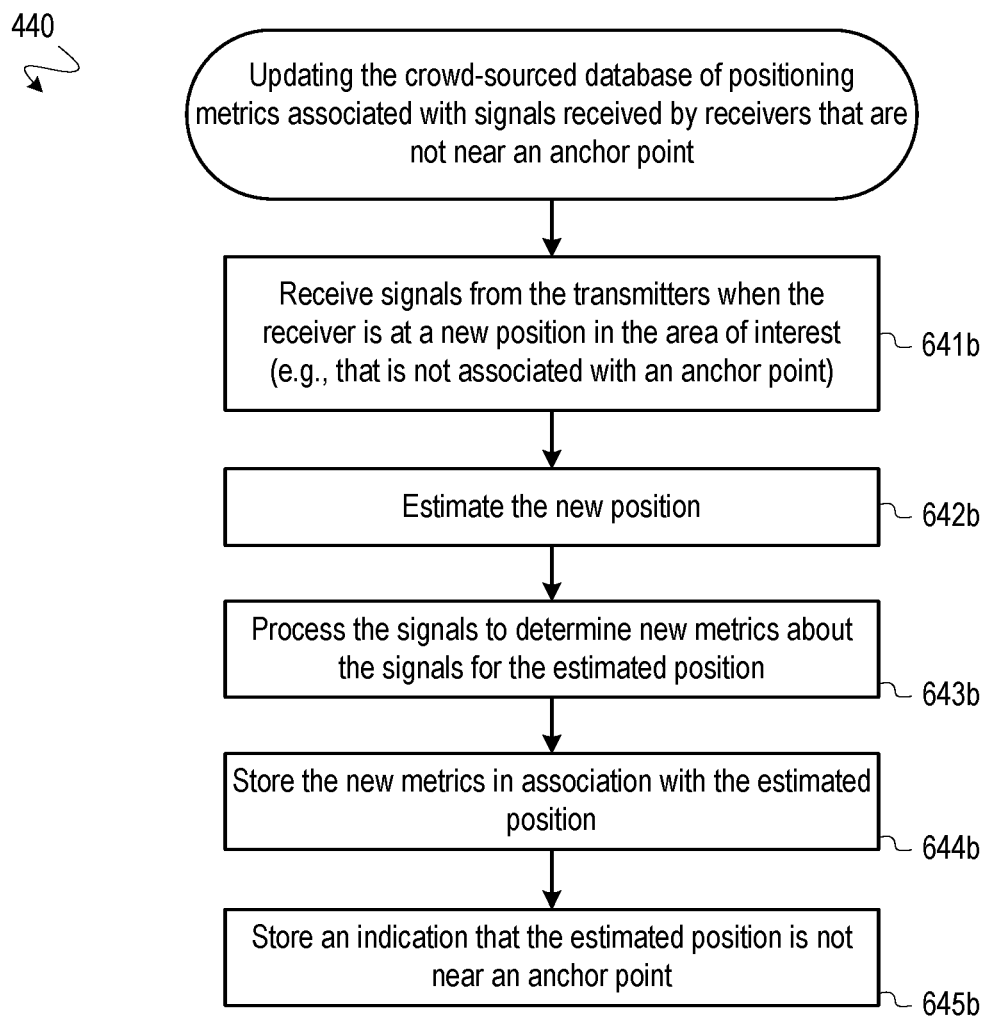
FIG. 6B shows a process for updating a crowd-sourced database of metrics associated with signals received by receivers that are not near an anchor point.

FIG. 6B shows a process for updating the crowd-sourced database of metrics associated with signals received by receivers that are not near an anchor point. This process could occur independently, or as part of step 440 of FIG. 4. The process includes the steps of: receiving signals from transmitters when the receiver is at a new position in the area of interest (e.g. that is determined to not associated with a predefined anchor point) (step 641b); estimating the new position (e.g. using the signals, using recorded movement between the new position and an anchor point of a known location, or another approach) (step 642b); processing the signals to determine new metrics about the signals for the estimated position (step 643b); storing the new metrics in association with the estimated position (step 644b); and storing an indication that the estimated position is not a predefined anchor point at a known location (step 645b). The new position can then be designated as a new crowd-sourced anchor point.

A determination that the new position is not associated with a predefined anchor point may be made based on different considerations. For example, an assumption may be made that the new position is not associated with a predefined anchor point when: an anchor point is not detected by the receiver; an anchor point is not within a tolerated distance from an estimate of the new position; the receiver has moved away from an anchor point as determined by tracking the receiver's movement; or other considerations.

Alternatively, in an additional step of FIG. 6B (not shown), use of other approaches like the approach described later in relation to FIG. 8 can generate a better estimate of the new position (or the true position of the new position can be determined).

Figures 7, 8:
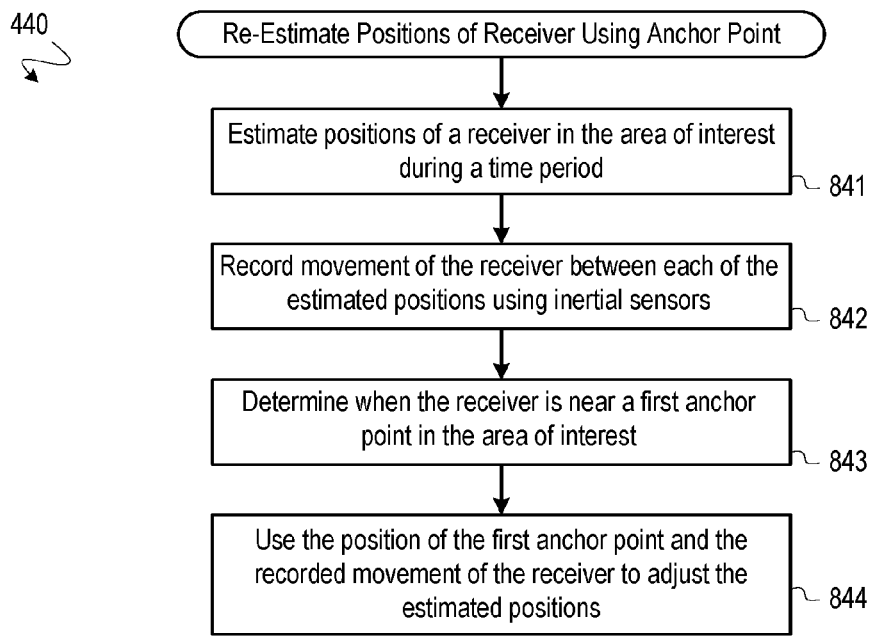
FIG. 7 presents a table of crowd-sourced metrics that may be stored.
FIG. 8 shows a process for updating an initial position estimate of a receiver using anchor points.

Attention is now drawn to FIG. 7, which presents a table of crowd-sourced metrics that may be stored in a crowd-sourced data source. Example processes for collecting such metrics were discussed in relation to FIG. 6A and FIG. 6B. As shown, data collected may include: a refined estimate of a position (or the true position) within an area of interest, and an initial estimate of the position computed using signals from remote transmission sources. Stored data may also include, for each of the remote transmission sources: (a) a pseudorange to that remote transmission source, which may be derived from multiple pseudoranges corresponding to multiple signals that were received at different times by the receiver and/or other receivers at the position; (b) an estimate of multipath delay (i.e. pseudorange correction) due to multipath signal traversal from that remote transmission source; (c) a standard deviation of a mean multipath delay when multiple signals are used to determine the multipath delay; (d) the signal strength for that remote transmission source as measured by the receiver; (e) signal-to-noise ratios for signals originating from that remote transmission source (not shown); and/or (f) a field indicating whether the position within the area of interest is near an anchor point.

Metrics can be used in different ways. For example, one process includes the steps of: receiving, at receiver, signals from remote transmission sources; processing the signals to identify signal metrics; comparing the identified signal metrics to stored signal metrics; if the identified signal metrics match particular stored signal metrics that are associated with a pre-stored location (e.g. of a predefined or crowd-sourced anchor point), then determining the position of the receiver using the pre-stored location; and if the identified signal metrics do not match stored signal metrics, determining the position of the receiver without using a pre-stored location.

Even though a location may not be a predefined anchor point (indicated by "N" in the table, where a predefined anchor point is indicated by "Y"), a receiver near that location may still benefit through the use of the signal metrics that were collected at that location. For example, if the receiver is aware of multipath delays associated with positioning signals near that location, the receiver may make corrections for such delays and generate a more accurate estimate of its position.

FIG. 8 shows a process for updating an initial position estimate of a receiver using anchor points. This process could occur as part of step 440 of FIG. 4. The process includes the steps of: estimating positions of a receiver in the area of interest during a time period (step 841); recording movement of the receiver between each of the estimated positions using inertial sensors (step 842); determining when the receiver is near a first anchor point in the area of interest (step 843); and using the position of the first anchor point and the recorded movement of the receiver to adjust the estimated positions (step 844).

Using anchor points with an inertial tracking system of the receiver may improve motion estimation by allowing a motion estimation algorithm of the receiver to eliminate accumulated sensor drift (e.g. accelerometer drift) at each of the anchor points.

Further, anchor points may be used to perform "backward smoothing" (position corrections made for a previously traveled path) on the estimated path of travel of the receiver between the anchor points to further improve the position accuracy. If the recorded movement of a receiver (e.g. direction, speed, etc.) is available, the position estimate generated using an anchor point can be 'propagated' backward or forward in time to help improve past and future position estimates, even when the receiver was or is not in proximity of an anchor point when determining those position estimates.

To elaborate, when a receiver is near an anchor point, its position may be assumed to be the location of that anchor point (or offset from the anchor point's location by some amount of distance). As the receiver leaves the proximity of the anchor point, it may continue to generate position estimates using inertial sensors (e.g. velocity and inertial sensors to estimate its direction and rate of travel). When the initial position estimate of the receiver is the location of the anchor point (or offset from the location), the receiver can continue to estimate its position with a lower positional error than if it had not used the location of the anchor point. However, the estimated movement the receiver can have errors due to sensor errors and inaccuracies resulting in errors in the future position estimates. Thus, a post-processing algorithm, such as a backward smoother, may be used to correct the receiver's recorded movement using pseudoranges generated from positioning signals received by the receiver and/or position estimates from a standard positioning engine used in typical positioning systems to compute position. Of course, a similar approach can be used to re-estimate positions of the receiver that preceded the receiver's position near an anchor point, or to re-estimate positions of the receiver in between anchor points.

Using recorded movement can be used along with the processes detailed above to determine pseudorange and SNR metrics for estimated positions of the receiver that are not assumed to be near an anchor point. For example, since an estimate of a receiver's position at a first instance in time can be unreliable due to multipath, a new estimate of the receiver's position at the first instance in time can be computed by: (1) determining that the receiver is near an anchor point at a second instance in time; and (2) determining the new estimate of the receiver's position at the first instance in time by moving the receiver away from the location of the anchor point using recorded movement of the receiver as it traveled between its positions at the first and second instances in time. A similar approach can be used to determine a position of a receiver for step 643*a* after the receiver leaves the proximity of an anchor point. Though the corrected path of travel may not help the receiver at the time of correction, the corrected path of travel may provide for more accurate entries into the crowd-sourced database discussed in relation to FIG. 7.

Figure 9:
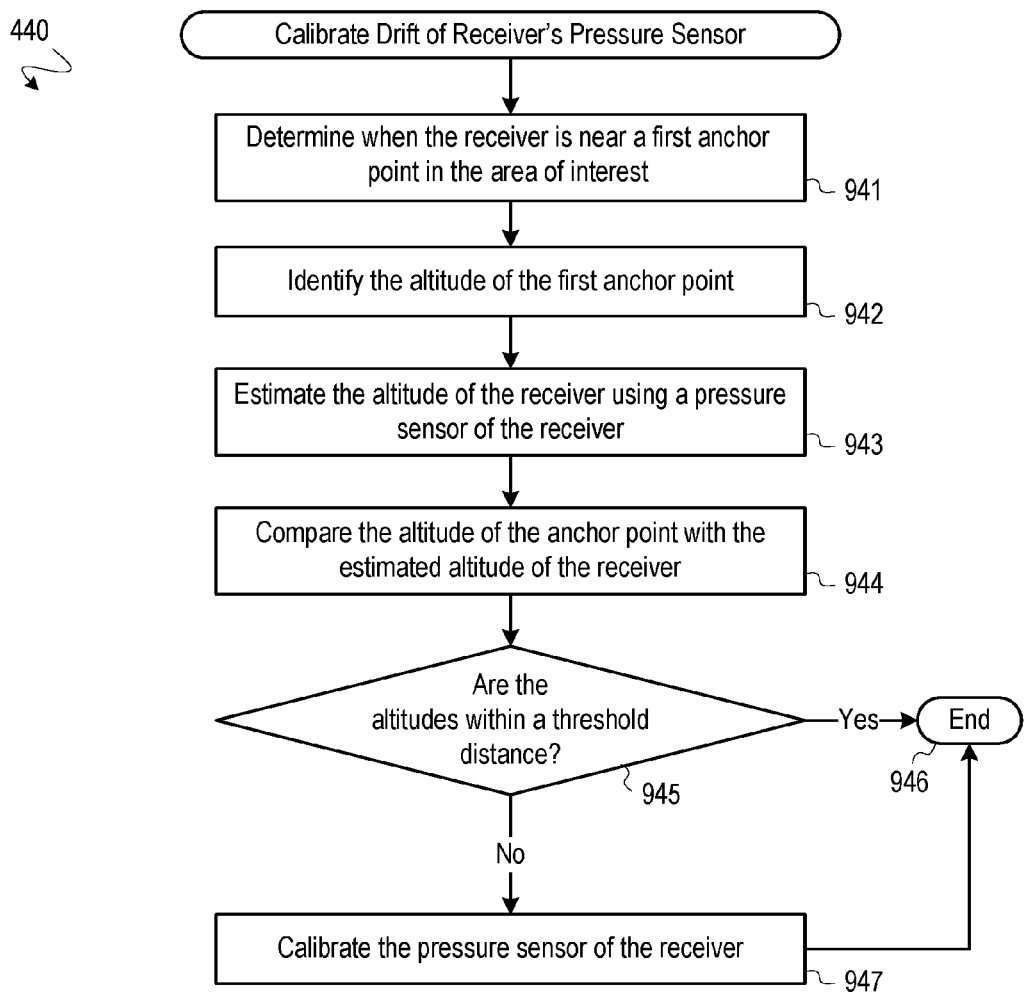
FIG. 9 shows a process for calibrating a receiver's pressure sensor using anchor points.

FIG. 9 shows a process for calibrating a receiver's pressure sensor using anchor points. This process could occur as part of step 440 of FIG. 4. A receiver may use a pressure sensor (e.g. an atmospheric pressure sensor) to generate altitude estimates of the receiver, as is known in the art. The process of using an anchor point to calibrate the receiver's pressure sensor includes the steps of: determining when the receiver is at a first anchor point in the area of interest (step 941); identifying the altitude of the first anchor point (step 942); estimating the altitude of the receiver using a pressure measurement from a pressure sensor of the receiver (step 943); comparing the altitude of the anchor point with the estimated altitude of the receiver (step 944); determining if the altitudes are equal or within a predefined and stored threshold distance from each other (e.g. 0-3 meters) (step 945); if the altitudes are within the threshold distance, ending the process (step 946); and if the altitudes are not within a threshold distance, calibrating the pressure sensor of the receiver using the difference between the altitude of the first anchor point and the altitude estimated using the pressure sensor (step 947). Such calibration may be used to correct for drift of the pressure sensor of the receiver, thus making altitude estimates of the receiver more accurate in the future. For example, the calibration may be a correction value that, if added to or subtracted from the pressure measurement used in step 943, would cause the estimated altitude to be equal to or within the threshold distance of the altitude of the first anchor point. Approaches for estimating altitude using a pressure measurement are described in co-owned U.S. application Ser. No. 14/618,137, filed Feb. 10, 2015, and U.S. application Ser. No. 13/296,067, filed Nov. 14, 2011.

Figure 10:
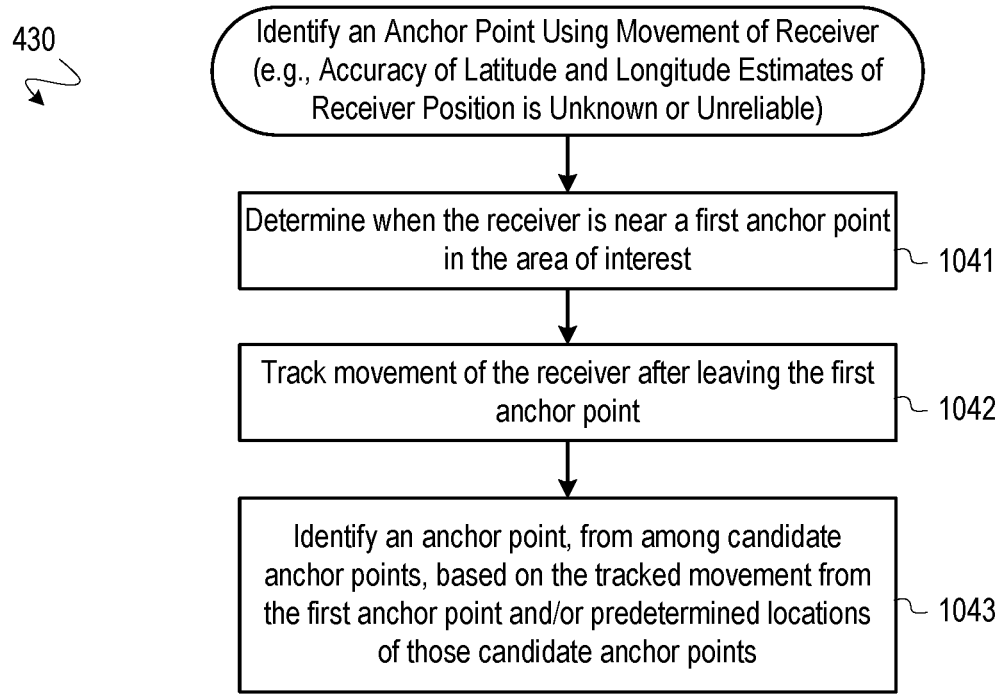
FIG. 10 shows a process for using movement of a receiver to determine if a receiver is near an anchor point.

FIG. 10 shows a process for using movement of a receiver to determine if a receiver is near an anchor point. This process could occur as part of step 430 of FIG. 4. The process includes the steps of: determining when the receiver is near a first anchor point in the area of interest (step 1041); tracking the movement of the receiver after leaving the first anchor point—e.g. a period of time during which the receiver moved, a rate of movement, a direction of movement, movement along latitude/longitude (X,Y) axes, and/or movement along altitude (Z) axis (step 1042); and identifying an anchor point, from among candidate anchor points, based on the tracked movement from the first anchor point and/or predetermined locations of those candidate anchor points—e.g. a map of the area of interest, coordinates or regions within the area of interest, relative locations of the candidate anchor points (step 1043).

For example, an ascending/descending anchor point (e.g. stairs, a ramp, an escalator, an elevator) may be identified when recently tracked movement is ascending/descending (e.g. movement along the Z axis matches vertical movement allowed (or required) by the anchor point, or the movement along the Z axis exceeds a threshold amount of vertical movement permitted when the receiver is not ascending/descending the anchor point). A non-ascending/non-descending anchor point may be identified when recently tracked movement is not ascending/descending (e.g. movement along the Z axis does not match vertical movement allowed (or required) by an ascending/descending anchor point, or the movement along the Z axis does not exceed a threshold amount of vertical movement permitted when the receiver is not ascending/descending an anchor point). Other candidates may be excluded.

Alternatively, an anchor point may be identified where that anchor point is within a distance from the first anchor point that falls within a maximum distance the receiver could have traveled during the period of time based on a maximum rate of travel. An anchor point may be identified where that anchor point is within a distance that is determined based on the rate of movement for the receiver. Other candidate anchor points outside of the maximum distance may be excluded.

Alternatively, an anchor point may be identified along a direction of travel for the receiver while excluding other candidate anchor points along other directions.

Figure 11:
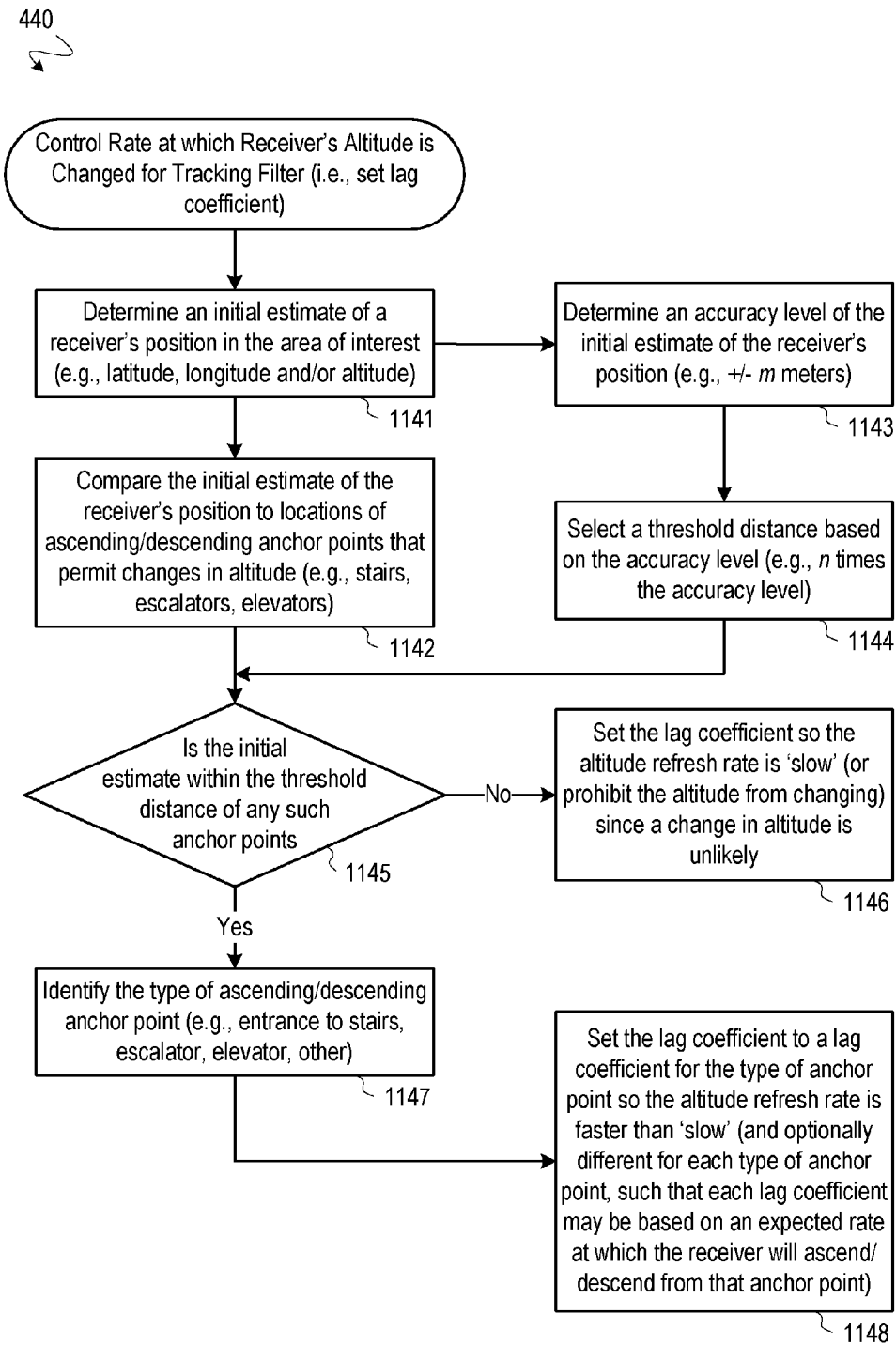
FIG. 11 shows a process for using anchor points to adjust a refresh rate of a receiver's altitude estimate.

FIG. 11 shows a process for using anchor points to adjust a refresh rate for estimating a receiver's altitude. This process could occur as part of step 440 of FIG. 4. The process includes the steps of: determining an initial estimate of a receiver's position in the area of interest (e.g. latitude, longitude and/or altitude) (step 1141); comparing the initial estimate of the receiver's position to positions of ascending/descending anchor points that permit changes in altitude (e.g. stairs, ramps, escalators, elevators) (step 1142); determining an accuracy level of the initial estimate of the receiver's position (e.g. +/− m meters) (step 1143); selecting a threshold distance based on the accuracy level (e.g. n times the accuracy level) (step 1144); determining if the initial estimate is within the threshold distance of any ascending/descending anchor points (step 1145); if the initial estimate is not within the threshold distance, setting a lag coefficient so the altitude refresh rate is 'slow' (or prohibit the altitude from changing) since a change in altitude is unlikely (step 1146); if the initial estimate is within the threshold distance, identifying the type of ascending/descending anchor point (e.g. stairs, escalator, elevator, other) (step 1147); and setting the lag coefficient to a lag coefficient for the type of anchor point so that the altitude refresh rate is faster than 'slow' (and optionally different for each type of anchor point, such that each lag coefficient may be based on an expected rate at which the receiver will ascend/descend from or along that anchor point) (step 1148). Discussion of the relationship between anchor point types and associated refresh rates will follow.

Figures 12, 13:
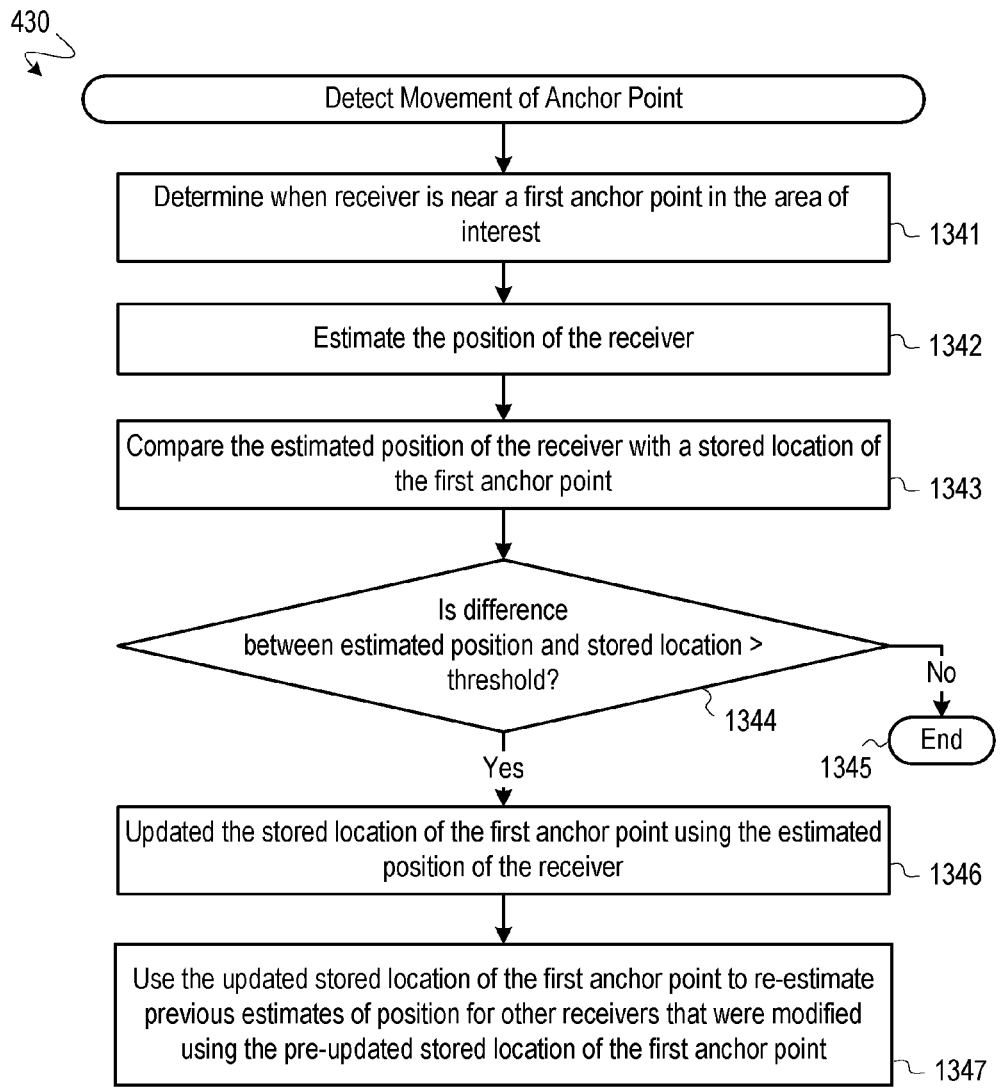
FIG. 12 presents a table relating types of anchor points to a refresh rate of a receiver's altitude estimate.
FIG. 13 shows a process for updating a stored location of an anchor point based on a position of a receiver.

FIG. 12 presents a table relating types of anchor points to a refresh rate of a receiver's altitude estimate. As discussed in relation to FIG. 11, if the receiver identifies that it is within a threshold distance of an anchor point associated with a change in elevation, it may update the rate at which it generates altitude estimates by adjusting a parameter designated as a lag coefficient. The lag coefficient may be defined as a value that is inversely proportional to the anticipated rate of ascent/descent that a receiver is expected to observe at a given anchor point. The refresh rates may be related to velocity of escalators or elevators in the vicinity of the anchor point.

By way of example, the values of the anticipated rate of ascent/descent shown in the table of FIG. 12 relate as follows: $R_{Stair} < R_{Esc} < R_{Elv}$. The values of the lag coefficients shown in the table of FIG. 12 relate as follows: $C_{Stair} > C_{Esc} > C_{Elv}$. These lag coefficient values may represent the number of samples over which the altitude of a receiver is estimated. Alternatively, these lag coefficients could relate to the number of taps in a FIR filter operating on estimates of altitude, or they could be used to adjust the parameter of "observational noise" in a Kalman Filter.

How lag is controlled depends on which filter is used to filter altitude estimates. For example, if a one-pole IIR filter is used (e.g. y[k]=(1−alpha)*y[k−1]+alpha*x[k]), the lag is controlled by the value of alpha (alpha is between 0 and 1), where a larger alpha leads to less smoothing and less lag, and smaller alpha leads to more smoothing and more lag. If a Kalman filter is used, the lag is controlled by a parameter called the process noise, where larger process noise leads to less smoothing and less lag, and smaller process noise leads to more smoothing and more lag. Of course, there are other types of filters (e.g. FIR, adaptive IIR, etc.), and each filter has its own parameter to control lag and smoothing. In general, these parameters are such that more smoothing leads to more lag even though the exact nature of the smooth-vs-lag trade-off is different for each filter type.

FIG. 13 shows a process for updating the stored location of an anchor point based on the position of a receiver. This process could occur as part of step 430 of FIG. 4. This process may be used to detect and update the stored location of an anchor point that is non-permanently fixed in an environment. Examples of such non-permanently fixed anchor points include Wi-Fi hotspots, NFC terminals, Bluetooth beacons, and other nodes. The process includes the steps of: determining when the receiver is near a first anchor point in the area of interest (step 1341); estimating the position of the receiver (step 1342); comparing the estimated position of the receiver with a stored location of the first anchor point (step 1343); determining if the difference between the estimated position and the stored location is greater than a threshold (step 1344); if the difference between the estimated position and the stored location is less than or equal to the threshold, ending the process (step 1345); if the difference between the estimated position and the stored location is greater than the threshold, updating the stored location of the first anchor point using the estimated position of the receiver (step 1346); and using the updated stored location of the first anchor point to re-estimate the previous estimates of position for other receivers that were modified using the pre-updated stored location of the first anchor point (step 1347).

Figure 14:
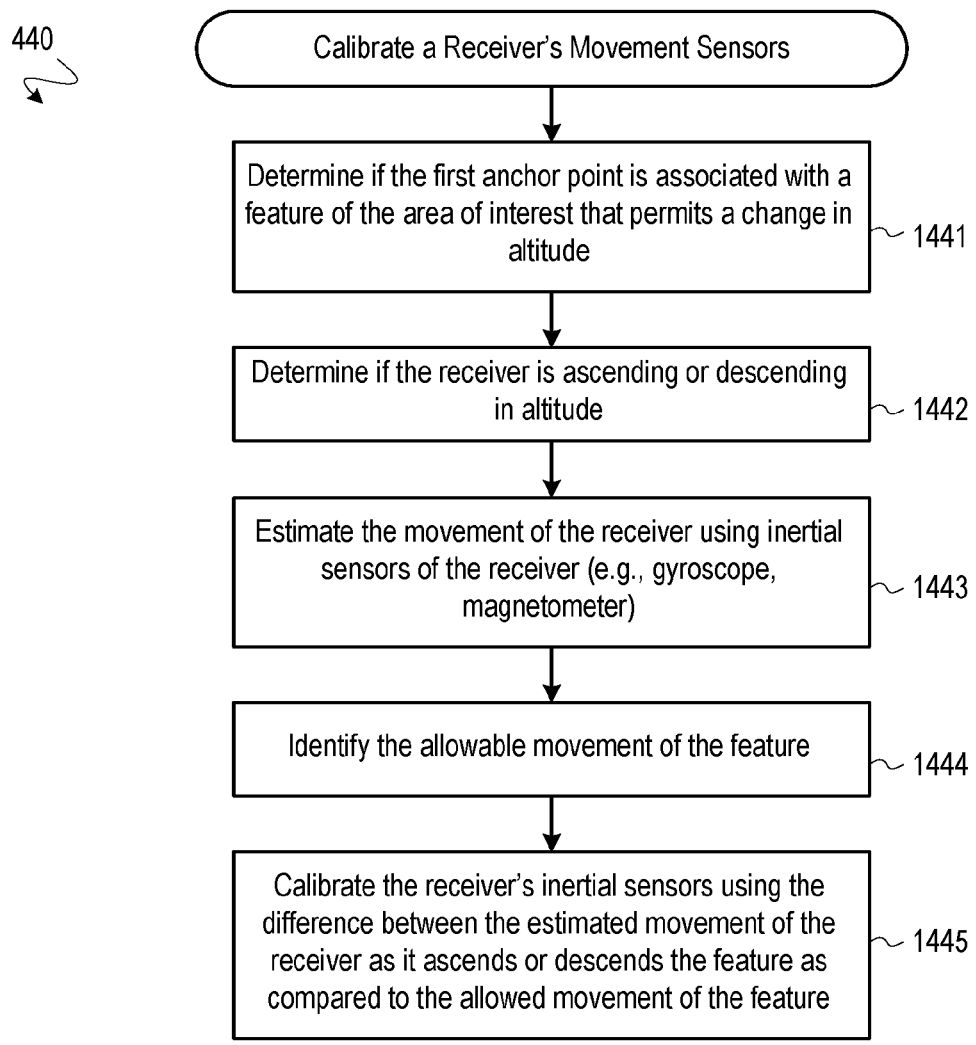
FIG. 14 shows a process for calibrating an inertial sensor using an anchor point.

FIG. 14 shows a process for calibrating a receiver's inertial sensors (e.g. direction, velocity, orientation, etc.) using an anchor point. Inertial sensors, such as gyroscopic sensors and magnetometers, may exhibit a drift and/or bias which may worsen with time. Using estimates of a receiver's movement (e.g. direction, velocity, orientation, etc.) generated using the inertial sensors as compared to a known 'true' movement of the receiver, such errors may be identified and corrections may be performed the next time the inertial sensors are used.

By way of example, a process for calibrating inertial sensors may include the steps of: determining if the first anchor point is associated with a feature in the area of interest that permits a change in altitude, such as a staircase, an elevator, or an escalator (step 1441); determining if the receiver is ascending or descending in altitude (e.g. based on a change of pressure measured by a pressure sensor of the receiver, or based on detected vertical movement by an inertial sensor) (step 1442); estimating the movement (e.g. direction, velocity, and/or orientation) of the receiver using inertial sensors of the receiver (e.g. gyroscope, magnetometer) (step 1443); identifying the allowable movement of the feature in the area of interest (e.g. from stored information about that feature in a surveyed digital map of the area of interest) (step 1444); and calibrating the receiver's inertial sensors using the difference between the estimated movement of the receiver as it ascends or descends the feature as compared to the allowable movement of the feature for ascending or descending (e.g. which may include horizontal and/or vertical movement) (step 1445).

Figure 15:
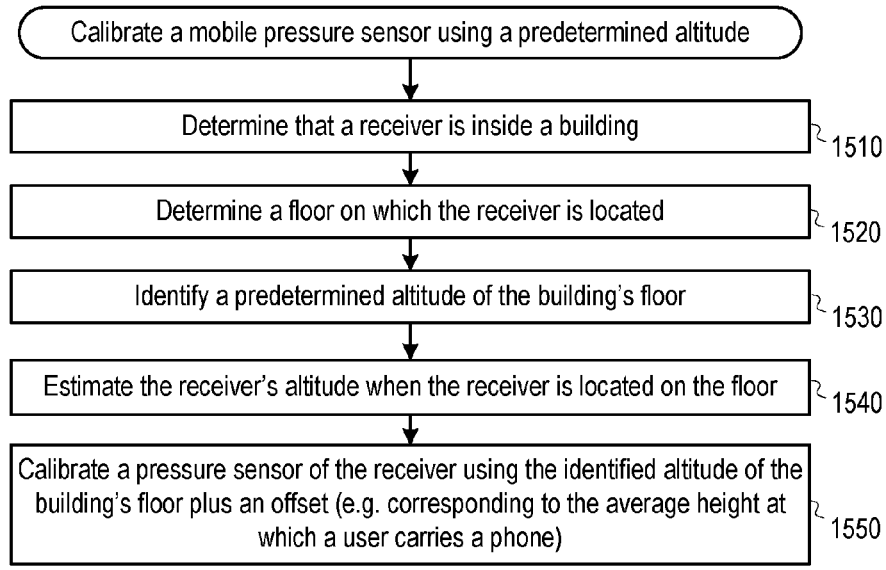
FIG. 15 shows a process for calibrating a mobile pressure sensor using a predetermined altitude.

FIG. 15 shows a process for calibrating a mobile pressure sensor using a predetermined altitude, which includes the steps of: determining that a receiver is inside a building (step 1510); determining a floor on which the receiver is located (step 1520); identifying a predetermined altitude of the building's floor (step 1530); estimating the receiver's altitude when the receiver is located on the floor (step 1540); and calibrating a pressure sensor of the receiver using the identified altitude of the building's floor plus an offset (e.g. corresponding to the average height at which a user carries a phone) (step 1550).

Any approach for determining that the receiver is inside a building during step 1510 may be used, including the approaches described in co-owned U.S. patent application Ser. No. 14/749,593, filed Jun. 24, 2015, entitled SYSTEMS AND METHODS FOR ESTIMATING WHETHER A RECEIVER IS INSIDE OR OUTSIDE A BUILDING.

Any approach for estimating the receiver's altitude when the receiver is located on the floor during step 1540 may be used. In one embodiment, the receiver's altitude may be estimated using the inverse of a barometric formula of:

$$h = \frac{RT}{gM} \ln\left(\frac{P_{user}}{P_{reference}}\right) + h_{reference}$$

where R, g, M are constants, $h_{reference}$ is a translated weather station pressure elevation (e.g. 0 m HAE), $P_{reference}$ is a translated weather station pressure, T is an outdoor ambient temperature, and $P_{user}$ is a pressure measured by the receiver. For clarity, an assumption can be made that a reference weather station is translated to 0 m HAE, which simplifies the barometric formula to:

$$h = \frac{RT}{gM} \ln\left(\frac{P_{user}}{P_{sea\text{-}level}}\right)$$

During step 1550, the estimate of the receiver's altitude, h, may be compared to the predetermined altitude of the building's floor, $h_{true}$, which was identified during step 1530. A difference between h and $h_{true}$ may be determined as $\Delta h = h_{true} - h$. The difference $\Delta h$ may then be used to calibrate the receiver's pressure sensor in the future by converting $\Delta h$ to a corresponding pressure difference, $\Delta P$, which represents a difference between the expected pressure and the estimated pressure. One example for converting $\Delta h$ to $\Delta P$ can be derived from the formulas above as:

$$\Delta P = \frac{gM}{RT} P_{user} \Delta h$$

The resultant $\Delta P$ can then be used to adjust future pressure measurements as follows:

$$P_{user\text{-}calibrated} = P_{user} - \frac{gM}{RT} P_{user} \Delta h$$

The resultant $\Delta P$ may be used until the process flow of FIG. 15 is carried out again at some point in the future.

Figure 16:
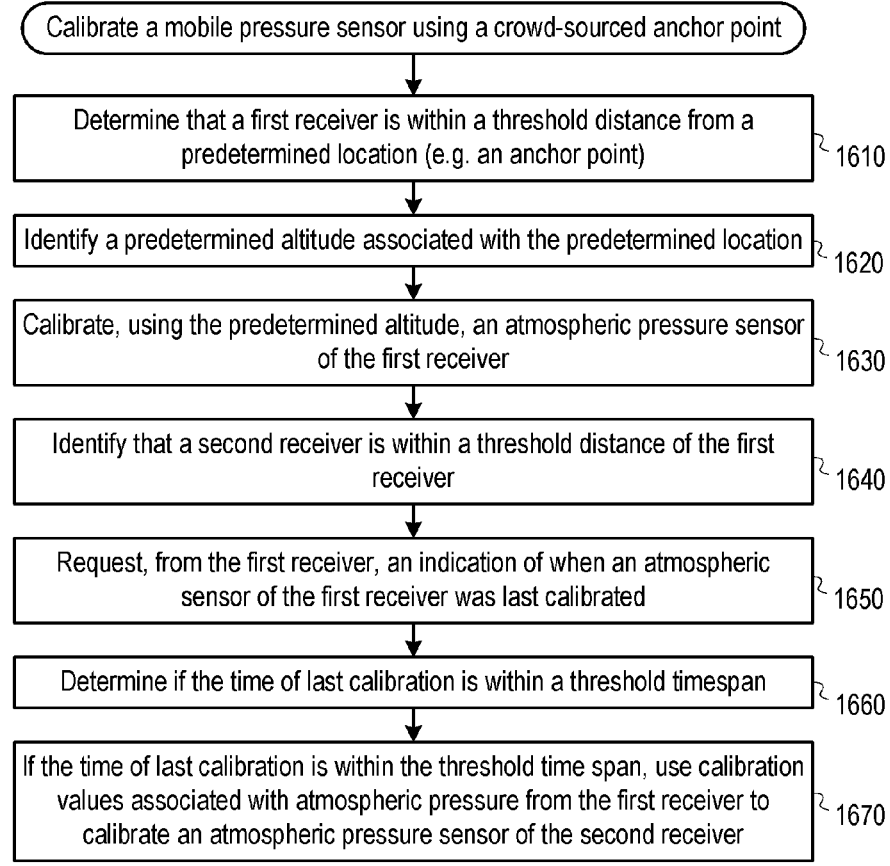
FIG. 16 shows a process for calibrating a mobile pressure sensor using a crowd-sourced anchor point.

FIG. 16 shows a process for calibrating a mobile pressure sensor using a crowd-sourced anchor point, which includes the steps of: determining that a first receiver is within a threshold distance from a predetermined location (e.g. an anchor point) (step 1610); identifying a predetermined altitude associated with the predetermined location (step 1620); calibrating, using the predetermined altitude, an atmospheric pressure sensor of the first receiver (step 1630); identifying that a second receiver is within a threshold distance of the first receiver (step 1640); requesting, from the first receiver, an indication of when an atmospheric sensor of the first receiver was last calibrated (step 1650); determining if the time of last calibration is within a threshold timespan (step 1660); and, if the time of last calibration is within the threshold time span, determining a difference between a calibrated pressure measurement of the first receiver and a pressure measurement of the second receiver, and then calibrating an atmospheric pressure sensor of the second receiver by adding or subtracting the determined difference from future pressure measurements of the second receiver (1670).

Other Aspects

The term "feature" as used herein may refer to a thing in an area of interest that can be an anchor point. For example, a feature may be a location in the area of interest, a pathway (e.g. hallway, stairs), transport equipment (e.g. escalator, elevator, moving walkway, vehicle), a stationary object (e.g. a bench, a sign, a beacon), an entry/exit point (e.g. a door, another opening, start/stop of a pathway), and other things described herein or otherwise understood in the art.

Various embodiments track movement of the receiver (along x, y and/or z axes). The movement of the receiver may be compared to corresponding movement allowed (or required) by a feature along corresponding x, y and/or z axes. The embodiments determine if the movement of the receiver matches the movement allowed (or required) by the feature. If so, it may be determined that the receiver is moving or has moved along that feature, and, therefore, the receiver is or was at a particular anchor point associated with that feature. If not, it may be determined that the receiver is not moving or has not moved along that feature, and, therefore, the receiver is not or was not at the particular anchor point associated with that feature. Depending on the embodiment, allowed (or required) movement may be in terms of a distance and/or a direction of movement receiver (along x, y and/or z axes). In some embodiments, the movement of the receiver matches the movement allowed (or required) by the feature when the receiver travels a length of the feature, ascends/descends a height/depth of the feature, travels in a length-wise direction of the feature, and/or other considerations.

Tracked movement can also be used to select from among two or more features. In one embodiment, a process for using movement of a receiver to determine which of two of more features the receiver is or was at includes the steps of: identifying, during a time period, type(s) of movement traveled by the receiver (e.g. ascending or descending movement; a length of movement along x and y axes; other movement); based on identifying the type(s) of movement of the receiver, identifying first and second features that each have similar type(s) of movement; identifying first movement(s) allowed (or required) by the first feature; identifying second movement(s) allowed (or required) by the second feature; comparing the movement(s) traveled by the receiver to the first movement(s) allowed (or required) by the first feature; comparing the movement(s) traveled by the receiver to the second movement(s) allowed (or required) by the second feature; and determining whether the movement(s) of the receiver occurred using the first feature or the second feature based on the comparisons. The movement(s) of the receiver may be determined to have occurred using the first feature when the movement(s) traveled by the receiver match the first movement(s) allowed (or required) by the first feature. Otherwise, the movement(s) of the receiver may be determined to have occurred using the second feature (e.g. either automatically upon disqualifying the first feature, or when the movement(s) traveled by the receiver match the second movement(s) allowed (or required) by the second feature).

A "remote transmission source" may take various forms, including a terrestrial transmitter, a satellite, a node, a third party receiver, or other device with transmission ability.

Detection of an anchor point may be carried out by image recognition using an image viewer of the receiver (a camera), sound recognition using a microphone of the receiver, or other ways known in the art.

In one embodiment, the receiver may include navigation software permitting a user to select a destination, and then providing guidance to the destination, which may be a venue. The user selecting or entering a destination may cause the receiver to load anchor point information associated with the destination from a data source. The data source may be remote or local to the receiver. Information on the anchor points may be used to assist in providing guidance to the user. The anchor point data may also be used for additional purposes or applications after the navigation to the destination has completed.

Methods of this disclosure may be implemented by hardware, firmware or software. One or more non-transitory machine-readable media embodying program instructions that, when executed by one or more machines, cause the one or more machines to perform any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Systems comprising one or more modules that perform or are operable to perform different method steps/stages disclosed herein are also contemplated, where the modules are implemented using one or more machines listed herein or other suitable hardware.

When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems (e.g., satellites, other transmitters, receivers, a server); RF front end module(s) with circuitry components (e.g., analog/digital logic and power circuitry, tuning circuitry, buffer and power amplifiers, and other components as is known in the art or otherwise disclosed herein); processing module(s) for performing signal processing (e.g., generating signals for transmission to other systems at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other conditions); and/or interface module(s) for exchanging information with other systems via other links other than a radio link. Signals transmitted by a transmitter may carry different information that, once determined by a receiver or a server, may identify the following: the transmitter that transmitted the signal; the location (LLA) of that transmitter; pressure, temperature, humidity, and other conditions at or near that transmitter; and/or other information.

A receiver may be in the form of a computing device (e.g., a mobile phone, tablet, laptop, digital camera, tracking tag). A receiver may also take the form of any component of the computing device, including a processor. By way of example, a receiver may include: antenna module(s) for exchanging signals with other systems (e.g., satellites, terrestrial transmitters, receivers); RF front end module(s) with circuitry components (e.g., mixers, filters, amplifiers, digital-to-analog and analog-to-digital converters as is known in the art or otherwise disclosed herein); processing module(s) for signal processing of received signals to determine position information (e.g., times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g., pressure, temperature, humidity, wind), which may be compared to the same environmental conditions at or near transmitters to determine the altitude of the receiver; other sensor module(s) for measuring other conditions (e.g., acceleration, velocity, orientation, light, sound); interface module(s) for exchanging information with other systems via other links other than a radio link; and/or input/output module(s) for permitting a user to interact with the receiver. Processing by the receiver can also occur at a server.

It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

RELATED APPLICATIONS

This application relates to the following related application(s): U.S. Pat. Appl. No. 62/221,076, filed Sep. 20, 2015, entitled POSITION ESTIMATION OF A RECEIVER USING ANCHOR POINTS; and U.S. Pat. Appl. No. 62/233,957, filed Sep. 28, 2015, entitled CALIBRATING A MOBILE PRESSURE SENSOR. The content of each of the related application(s) is hereby incorporated by reference herein in its entirety.

The invention claimed is:

1. A method for identifying and using anchor points in connection with one or more receivers, wherein the method comprises:
   identifying an area of interest that includes anchor points; and
   using at least one of the anchor points to determine a position of a receiver by:
      determining a movement traveled by the receiver;
      determining a movement allowed or required by an anchor point;
      comparing the movement traveled by the receiver to the movement allowed or required by the anchor point;
      determining, based on the comparison, whether the movement of the receiver occurred using the anchor point,
      wherein the movement of the receiver is determined to have occurred using the anchor point when the movement traveled by the receiver matches the movement allowed or required by the anchor point, and
      wherein the movement of the receiver is determined to have not occurred using the anchor point when the movement traveled by the receiver does not match the movement allowed or required by the anchor point;
      if the movement of the receiver is determined to have occurred using the anchor point, determining the position of the receiver using a location of the anchor point; and
      if the movement of the receiver is determined to have not occurred using the anchor point, determining the position of the receiver without using the location of the anchor point.

2. The method of claim 1, wherein determining the position of the receiver using a location of the anchor point comprises determining the position of the receiver as the location of the anchor point.

3. A method for identifying and using anchor points in connection with one or more receivers, wherein the method comprises:
   identifying an area of interest that includes anchor points; and using at least one of the anchor points to determine a position of a receiver by:
  determining, during a time period, a movement of the receiver;
  identifying a first anchor point and a second anchor points that each allows the movement of the receiver;
  comparing the movement of the receiver to a first movement allowed or required by the first anchor point, and comparing the movement of the receiver to a second movement allowed or required by the second anchor point;
  determining whether the movement of the receiver occurred using the first anchor point or the second anchor point based on the comparisons,
  wherein the movement of the receiver is determined to have occurred using the first anchor point when the movement of the receiver matches the first movement allowed or required by the first anchor point, and
  wherein the movement of the receiver is determined to have occurred using the second anchor point when the movement of the receiver matches the second movement allowed or required by the second anchor point;
  if the movement of the receiver is determined to have occurred using the first anchor point, determining the position of the receiver using a first location of the first anchor point; and
  if the movement of the receiver is determined to have occurred using the second anchor point, determining the position of the receiver using a second location of the second anchor point.

4. The method of claim 3, wherein determining the position of the receiver using the first location of the first anchor point comprises determining the position of the receiver as the first location of the first anchor point, and wherein determining the position of the receiver using the second location of the second anchor point includes determining the position of the receiver as the second location of the second anchor point.

5. A method for identifying and using anchor points in connection with one or more receivers, wherein the method comprises:
  identifying an area of interest that includes anchor points;
  using at least one of the anchor points to determine a position of a receiver by:
    receiving, at the receiver, a signal transmitted by a remote transmission source;
    identifying a signal strength of the received signal;
    comparing the signal strength of the received signal to one or more signal strength values associated with a first anchor point;
    if the signal strength of the received signal is greater than or equal to the one or more signal strength values associated with the first anchor point, determining the position of the receiver using a first location of the first anchor point; and
    if the signal strength of the received signal is not greater than or equal to any of the one or more signal strength values associated with the first anchor point, determining the position of the receiver without using the first location of the first anchor point.

6. The method of claim 5, wherein if the signal strength of the received signal is not greater than or equal to the one or more signal strength values associated with the first anchor point, the method comprises:
  comparing the signal strength of the received signal to one or more signal strength values associated with a second anchor point;
  if the signal strength of the received signal is greater than or equal to the one or more signal strength values associated with the second anchor point, determining the position of the receiver using a second location of the second anchor point; and
  if the signal strength of the received signal is not greater than or equal to any of the one or more signal strength values associated with the second anchor point, determining the position of the receiver without using the second location of the second anchor point.

7. The method of claim 5, wherein determining the position of the receiver using the first location of the first anchor point comprises determining the position of the receiver as the first location of the first anchor point.

8. A method for identifying and using anchor points in connection with one or more receivers, wherein the method comprises:
  identifying an area of interest that includes anchor points;
  determining that a receiver is near an anchor point;
  identifying an altitude of the anchor point;
  generating an estimated altitude of the receiver using one or more pressure measurements from a pressure sensor of the receiver;
  comparing the altitude of the anchor point with the estimated altitude of the receiver; and
  if an altitude difference between the altitude of the anchor point and the estimated altitude of the receiver exceeds a threshold amount of altitude, calibrating the pressure sensor of the receiver using the altitude difference.

9. A method for identifying and using anchor points in connection with one or more receivers, wherein the method comprises:
  identifying an area of interest that includes anchor points;
  using at least one of the anchor points to determine a position of a receiver by:
    determining that the receiver is near an anchor point that permits a change in altitude of the receiver;
    identifying, from among a plurality of lag coefficient values, a first lag coefficient value that is associated with the anchor point;
    setting a lag coefficient to the first lag coefficient value while the receiver is near the anchor point;
    generating one or more estimated altitudes of the receiver at a first update rate associated with the first lag coefficient value while the receiver is near the anchor point; and
    determining the position of the receiver using an estimated altitude from the one or more estimated altitudes.

10. The method of claim 9, wherein the method further comprises:
  determining that the receiver is not near the anchor point that permits a change in altitude of the receiver;
  after determining that the receiver is not near the anchor point, identifying a second lag coefficient value from among the plurality of lag coefficient values;
  setting the lag coefficient to the second lag coefficient value while the receiver is not near the anchor point; and
  generating one or more estimated altitudes of the receiver at a second update rate associated with the second lag coefficient value while the receiver is not near the anchor point.

11. One or more non-transitory machine-readable media embodying program instructions that, when executed by one or more machines, cause the one or more machines to perform a method for identifying and using anchor points in connection with one or more receivers, wherein the method comprises:

identifying an area of interest that includes anchor points; and using at least one of the anchor points to determine a position of a receiver by:
- determining a movement traveled by the receiver;
- determining a movement allowed or required by an anchor point;
- comparing the movement traveled by the receiver to the movement allowed or required by the anchor point;
- determining, based on the comparison, whether the movement of the receiver occurred using the anchor point,
- wherein the movement of the receiver is determined to have occurred using the anchor point when the movement traveled by the receiver matches the movement allowed or required by the anchor point, and
- wherein the movement of the receiver is determined to have not occurred using the anchor point when the movement traveled by the receiver does not match the movement allowed or required by the anchor point;
- if the movement of the receiver is determined to have occurred using the anchor point, determining the position of the receiver using a location of the anchor point; and
- if the movement of the receiver is determined to have not occurred using the anchor point, determining the position of the receiver without using the location of the anchor point.

12. The one or more non-transitory machine-readable media of claim 11, wherein determining the position of the receiver using a location of the anchor point comprises determining the position of the receiver as the location of the anchor point.

13. One or more non-transitory machine-readable media embodying program instructions that, when executed by one or more machines, cause the one or more machines to perform a method for identifying and using anchor points in connection with one or more receivers, wherein the method comprises:

identifying an area of interest that includes anchor points; and using at least one of the anchor points to determine a position of a receiver by:
- determining, during a time period, a movement of the receiver;
- identifying a first anchor point and a second anchor point that each allows the movement of the receiver;
- comparing the movement of the receiver to a first movement allowed or required by the first anchor point, and comparing the movement of the receiver to a second movement allowed or required by the second anchor point;
- determining whether the movement of the receiver occurred using the first anchor point or the second anchor point based on the comparisons,
- wherein the movement of the receiver is determined to have occurred using the first anchor point when the movement of the receiver matches the first movement allowed or required by the first anchor point, and
- wherein the movement of the receiver is determined to have occurred using the second anchor point when the movement of the receiver matches the second movement allowed or required by the second anchor point;
- if the movement of the receiver is determined to have occurred using the first anchor point, determining the position of the receiver using a first location of the first anchor point; and
- if the movement of the receiver is determined to have occurred using the second anchor point, determining the position of the receiver using a second location of the second anchor point.

14. The one or more non-transitory machine-readable media of claim 13, wherein determining the position of the receiver using the first location of the first anchor point comprises determining the position of the receiver as the first location of the first anchor point, and wherein determining the position of the receiver using the second location of the second anchor point includes determining the position of the receiver as the second location of the second anchor point.

15. One or more non-transitory machine-readable media embodying program instructions that, when executed by one or more machines, cause the one or more machines to perform a method for identifying and using anchor points in connection with one or more receivers, wherein the method comprises:

identifying an area of interest that includes anchor points; using at least one of the anchor points to determine a position of a receiver by:
- receiving, at the receiver, a signal transmitted by a remote transmission source;
- identifying a signal strength of the received signal;
- comparing the signal strength of the received signal to one or more signal strength values associated with a first anchor point;
- if the signal strength of the received signal is greater than or equal to the one or more signal strength values associated with the first anchor point, determining the position of the receiver using a first location of the first anchor point; and
- if the signal strength of the received signal is not greater than or equal to any of the one or more signal strength values associated with the first anchor point, determining the position of the receiver without using the first location of the first anchor point.

16. The one or more non-transitory machine-readable media of claim 15, wherein if the signal strength of the received signal is not greater than or equal to the one or more signal strength values associated with the first anchor point, the method comprises:
- comparing the signal strength of the received signal to one or more signal strength values associated with a second anchor point;
- if the signal strength of the received signal is greater than or equal to the one or more signal strength values associated with the second anchor point, determining the position of the receiver using a second location of the second anchor point; and
- if the signal strength of the received signal is not greater than or equal to any of the one or more signal strength values associated with the second anchor point, determining the position of the receiver without using the second location of the second anchor point.

17. The one or more non-transitory machine-readable media of claim 15, wherein determining the position of the receiver using the first location of the first anchor point comprises determining the position of the receiver as the first location of the first anchor point.

18. One or more non-transitory machine-readable media embodying program instructions that, when executed by one or more machines, cause the one or more machines to perform a method for identifying and using anchor points in connection with one or more receivers, wherein the method comprises:
  identifying an area of interest that includes anchor points;
  determining that a receiver is near an anchor point;
  identifying an altitude of the anchor point;
  generating an estimated altitude of the receiver using one or more pressure measurements from a pressure sensor of the receiver;
  comparing the altitude of the anchor point with the estimated altitude of the receiver; and
  if an altitude difference between the altitude of the anchor point and the estimated altitude of the receiver exceeds a threshold amount of altitude, calibrating the pressure sensor of the receiver using the altitude difference.

19. One or more non-transitory machine-readable media embodying program instructions that, when executed by one or more machines, cause the one or more machines to perform a method for identifying and using anchor points in connection with one or more receivers, wherein the method comprises:
  identifying an area of interest that includes anchor points;
  using at least one of the anchor points to determine a position of a receiver by:
    determining that the receiver is near an anchor point that permits a change in altitude of the receiver;
    identifying, from among a plurality of lag coefficient values, a first lag coefficient value that is associated with the anchor point;
    setting a lag coefficient to the first lag coefficient value while the receiver is near the anchor point;
    generating one or more estimated altitudes of the receiver at a first update rate associated with the first lag coefficient value while the receiver is near the anchor point; and
    determining the position of the receiver using an estimated altitude from the one or more estimated altitudes.

20. The one or more non-transitory machine-readable media of claim 19, wherein the method further comprises:
  determining that the receiver is not near the anchor point that permits a change in altitude of the receiver;
  after determining that the receiver is not near the anchor point, identifying a second lag coefficient value from among the plurality of lag coefficient values;
  setting the lag coefficient to the second lag coefficient value while the receiver is not near the anchor point; and
  generating one or more estimated altitudes of the receiver at a second update rate associated with the second lag coefficient value while the receiver is not near the anchor point.

* * * * *